Figure 1:
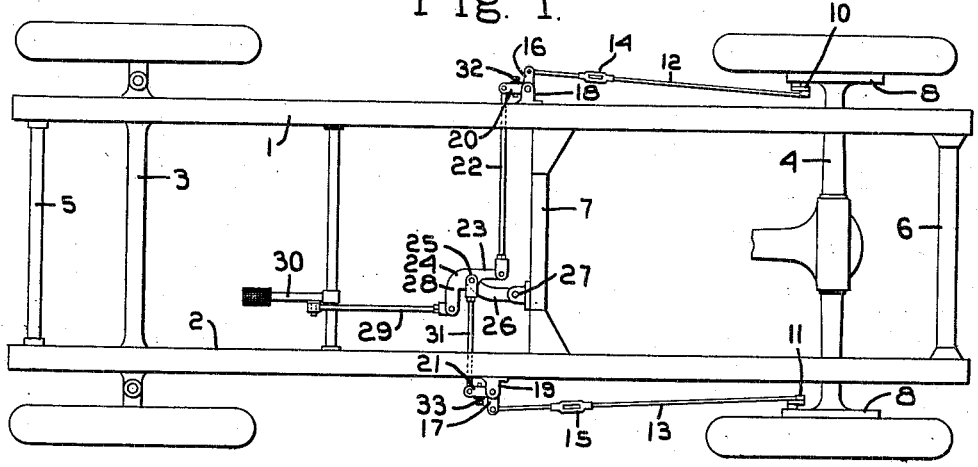

Oct. 28, 1930.  R. M. LOVEJOY  1,780,023
BRAKING MECHANISM FOR VEHICLES
Filed Aug. 10, 1927

Inventor.
Ralph M. Lovejoy
by Heard Smith & Bennant
Attys.

Patented Oct. 28, 1930

1,780,023

UNITED STATES PATENT OFFICE

RALPH M. LOVEJOY, OF BOSTON, MASSACHUSETTS

BRAKING MECHANISM FOR VEHICLES

Application filed August 10, 1927. Serial No. 211,954.

This invention relates to improvements in braking mechanism for vehicles, particularly automobiles, and the principal object of the invention is to provide means for transmitting power, from manually-controlled power-applying means, to the means for actuating the brake, which will not yield to pressure imposed upon it by the power-applying means.

Various types of power-applying means are used upon automobiles, including brake pedals, or levers, such as are commonly used on pleasure vehicles, and manually-controlled, power-operated mechanisms, such as fluid-controlled or electrically-controlled devices which are employed upon trucks and other heavy vehicles.

In certain braking mechanisms the brake-actuating means are connected by cables or links to the arms of a rock-shaft which is mounted in bearings in the frame, another arm of the rock-shaft being connected by a cable or link to a brake-actuating lever or other power-applying means. The rock-shaft, through which the power is transmitted, is usually approximately three-quarters of an inch to one inch in diameter and two and a half to three feet in length, with the arm to which the brake lever is attached located either centrally of the rock-shaft or between the center and one of the ends thereof. In either event power applied through the brake pedal or other power-applying means produces a substantial amount of torsional twist in the rock-shaft, and also sometimes bends the rock-shaft, so that a considerably greater movement of the brake pedal or lever will be required than that of the brake-actuating means. The resilience of the shaft when thus yielding to torsional and bending strains reduces the effective brake-applying force exerted upon the brake in a manner similar to the interposition of a spring between the power-applying means and the brake-actuating means. Furthermore, the amplitude of effective movement of the brake-applying lever, or other power-applying means, is necessarily limited. Movement of such pedal, lever, or other power-applying means, beyond its normal range of movement caused by torsional twisting and bending of the rock-shaft greatly lessens the effective force with which the brakes are applied, thus increasing the likelihood of accident when it is necessary to stop a vehicle quickly. While it would be possible, by increasing the diameter of the rock-shaft through which the power is transmitted, to provide a sufficiently rigid construction to avoid substantial torsional twisting and bending of the rock-shaft, it is impracticable to provide such larger rock-shafts in usual types of automobiles without interference with other mechanisms of the vehicle, particularly the propeller shaft, which has a very considerable vertical swinging movement caused by the yielding of the vehicle springs as the vehicle passes over uneven and rough roads. Furthermore, the additional cost of such larger rock-shafts and the brackets and accessories required would considerably increase the cost of production of the automobile.

In other types of braking mechanism a plurality of rock-shafts are employed which have arms connected by links or cables to the brake-applying means and other arms connected, through an equalizer, to the power-applying means. In such cases, however, the rock-shafts are of relatively small diameter and likewise yield to the torsional force which is applied to them. It is likewise impracticable to make such rock-shafts and their connections to the power-applying means of sufficient size and strength to overcome torsional twisting and bending because of the limited space in which they must be contained to avoid interference with the propeller shaft, muffler and other parts of the vehicle. The cost of such larger parts and the necessary accessories would considerably increase the cost of the automobile.

The present invention contemplates the provision of mechanism comprising substantially unyielding tension members of relatively small diameter and co-operating power-transmitting means which can readily be assembled upon the frame of the automobile in such a manner as not to interfere with the usual mechanism of the automobile, and particularly the propeller shaft, and which can be made and assembled at a minimum cost of production.

A further object of the invention is to provide an unyielding mechanism for transmitting power from the power-applying means to the brake-actuating mechanism comprising novel means for equalizing the power transmitted to the brakes, whether employed for a single pair of brakes or a plurality of pairs.

In brief, the invention comprises a system of inextensible tension members of relatively small diameter connected at one end to a manually-controlled power-applying means and at the other end to the respective brake-actuating means, and having intermediate, unyielding power-transmitting members operable to equalize the power transmitted from the power-applying means to the respective brake-actuating means.

A further object of the invention is to provide a braking mechanism of this character with means for limiting the action of certain of the power-transmitting members so that if one of the tension members which leads to a brake-actuating means should break, actuation of the companion brake-actuating means would not be prevented.

Preferred embodiments of the invention are illustrated in the accompanying drawings as applied to a braking mechanism in which the brake-applying means is shown in the form of the usual type of brake pedal.

Figure 2:
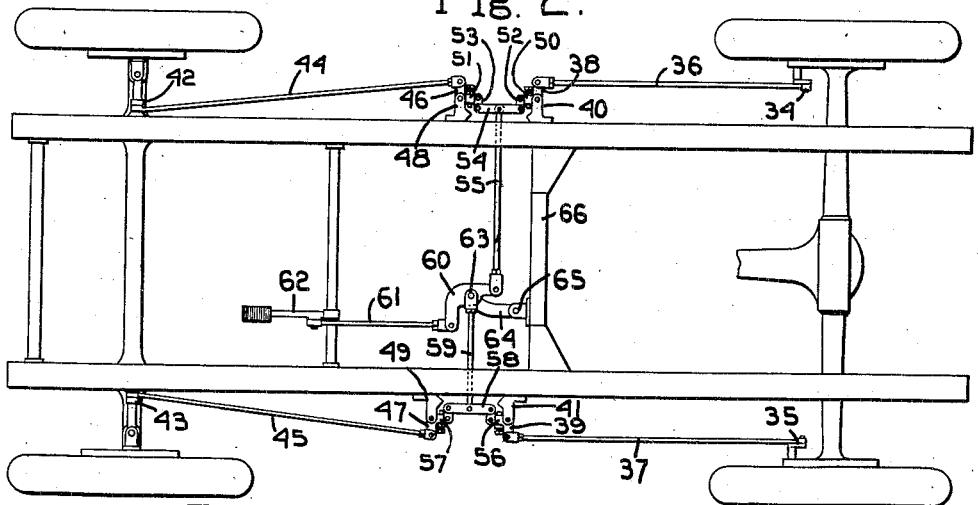
Figure 3:
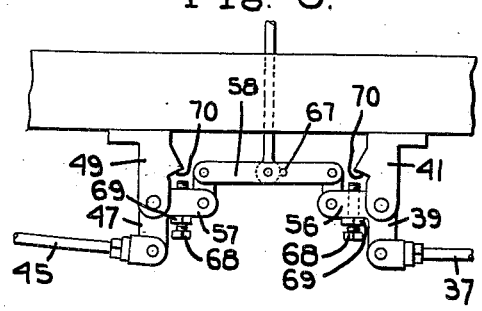
Figure 4:
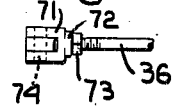

In the drawings, Figure 1 is a plan view of the chassis of a vehicle illustrating an embodiment of the present invention applied to the rear wheels of the vehicle;

Fig. 2 is a similar view of the chassis of a a vehicle illustrating the invention as applied to brakes for both the front and rear wheels, or in other words, a four-wheel brake;

Fig. 3 is an enlarged detail plan view of the unyielding power-transmitting mechanism forming a part of the system illustrated in Fig. 2; and Fig. 4 is a detail view of a preferred adjustable connection of a tension link to an unyielding power-transmitting member, this connection being in the form of a clevis having an internal screw-threaded shank which receives the screw-threaded end of the tension lever, with a lock nut thereon to retain the tension lever in adjusted position.

The construction illustrated in the accompanying drawings comprises a pair of side frames 1, 2, which may be and are of the usual form, to which the front and rear springs and axles 3 and 4 of the vehicle are secured. The side frames are connected together by the usual front and rear end girders 5 and 6 and intermediate girder 7 which usually is in the form of a channel bar rigidly connected to the side girders, which are ordinarily of channel bar form. The rear wheels are provided with usual braking mechanism which comprises brake drums 8 and 9, and brake shoes (not shown) which are operated by a usual brake-actuating mechanism comprising arms 10 and 11. These arms are pivotally connected at one end to inextensible members, such as steel links 12 and 13, which may, if desired, be provided with turn-buckles 14 and 15 for adjusting their effective length, and the other ends of the links are connected, through intermediate power-transmitting mechanism and inextensible tensions members, such as links, to the manually-operable brake pedal or lever.

In the preferred construction shown, the links 12 and 13 are connected, respectively, to the arms 16 and 17 of bell-crank levers, which are fulcrumed upon studs in suitable brackets 18 and 19 secured to the side frames, the arms 16 and 17 extending transversely of said side frames. The other arms 20 and 21 of the bell-crank levers extend longitudinally of the side frames and are pivotally connected at their outer ends, respectively, to inextensible links 22 and 31. The link 22 is pivotally connected at its inner end to one arm 23 of an intermediate bell-crank lever 24 having a floating fulcrum 25. This fulcrum is carried upon the end of an inextensible link 26 which is pivotally mounted upon a bracket 27 upon the central cross girder 7. The other arm 28 of the floating bell-crank lever is pivotally connected to one end of an inextensible link 29, the other end of which is pivotally connected to the lever of a manually-operable brake pedal 30, as illustrated, or may be actuated by other well known means.

In the operation of the device, when pressure is applied by the foot to the pedal 30 the power is transmitted through the inextensible tension lever 29 to the unyielding bell-crank lever 24. The longitudinally-extending arm 21 of the other side frame bell-crank lever is connected by a link 31 to one of the arms of the bell-crank lever 24 and preferably to the floating fulcrum thereon. The effective lengths of the bell-crank arms 28 and 23 are such that force applied through the link 29 to the arm 28 of the bell-crank lever, imposes equal tension upon the links 22 and 31.

In the operation of the device, power applied manually, as by the foot, to the brake lever 30 draws the inextensible tension member 29 forwardly, and thereby tends to rock the unyielding bell-crank lever 29 about its fulcrum, thereby transmitting power through the inextensible tension link 22 to the unyielding side frame bell-crank lever 20, and through the arm 16 thereof to the inextensible tension member 12 to the brake-actuating arm 10.

As the power is thus transmitted the intermediate bell-crank lever 24 is moved bodily laterally by reason of the fact that the force is applied transversely of the arm 28, which is at right angles to the other arm 23 thereof. Such lateral movement is permitted by the link 26, which pivotally connects the floating fulcrum 25 to the bracket 27. Such lateral movement imposes tension upon the inextensible link 31, which thereupon draws upon the arm 21 of the side frame bell-crank with an equal force to that which is transmitted through the link 22 to the other side frame bell-crank lever. As the arm 21 of the side frame bell-crank lever is drawn inwardly the transverse arm 17 thereof is drawn forwardly, thereby transmitting though the inextensible link 13 a force upon the brake-actuating arm 11 which is equal to the force transmitted through the tension member 12 to the brake-actuating arm 10, thus both brakes will be applied with equal force.

Any usual mechanism for removing the brakes from braking position may be employed in connection with the invention and need not be illustrated herein. Suitable means may be employed to limit the movement of the arms 20 and 21 of the side frame bell-crank levers, such, for example, as set screws 32 and 33 seated in the arms 20 and 21 and adapted to abut against the walls of the side frame when such arms are moved beyond a predetermined distance. If, therefore, one of the tension rods should break, the set screws 32, 33 will limit the movement of the bell-crank lever to which it is attached sufficiently to prevent the companion bell-crank lever from being rendered inoperative, so that the remaining brake can be applied, although with less force.

In Fig. 2, an embodiment of the invention is illustrated as applied to a vehicle having four-wheel brakes. In this construction the rear brakes are provided with actuating means including arms 34 and 35 which are connected by inextensible tension links 36 and 37 to transversely-extending arms of bell-crank levers 38 and 39, which are pivotally mounted upon brackets 40 and 41 upon the side frames. The front wheel brakes likewise are provided with actuating means having arms 42 and 43 which are respectively connected, by inextensible tension links 44 and 45, with bell-crank levers 46 and 47 which are pivotally mounted upon brackets 48 and 49 secured to the side frames. The arms 50 and 51 of the bell-crank levers 38 and 46 extend towards each other and are flexibly connected preferably by short links 52 and 53 to the end of an unyielding equalizer bar 54 which is pivotally connected centrally of its length to an inextensible link 55. The corresponding longitudinally-extending arms 56 and 57 of the bell-crank levers 39 and 47 are likewise connected by short links to the opposite ends of a similar equalizer bar 58, to the central portion of which a link 59 is connected. The links 55 and 59 are pivotally connected to a floating bell-crank lever 60 which in turn is pivotally connected by an inextensible link 61 to the manually-operable brake pedal or lever 62. As in the previous construction, the bell-crank lever 60 is pivotally mounted upon the free end of a link 64 which is pivoted at its opposite end upon a bracket 65 on the central transverse girder 66, so that the bell-crank lever is provided with a floating fulcrum.

In this construction, as in that previously described, the links 55 and 59 are so connected to the bell-crank lever 60 that force applied through the manually-operable brake lever 62 and tension member 61 will impose equal tension upon the tension rods 55 and 59. As illustrated herein, the bell-crank lever is so proportioned that the tension member 59 may be pivotally connected to the floating fulcrum 63 of the bell-crank lever. In the operation of the four-wheel brake, therefore, power applied to the manually-operable brake pedal or lever 62 transmits, through the inextensible link 61, the unyielding bell-crank lever 60, and the tension links 55 and 59, equal force to the equalizers 54 and 58, which act, respectively, upon the side frame bell-crank levers 38, 39, 46 and 47. The equalizers 54 and 58, therefore, transmit equal power through the members 36, 37, 44 and 45 to the brake-applying arms 34, 35, 42 and 43, so that all brakes are applied with equal force. Thus the present invention comprehends equalizing mechanism for both rear brakes and for both front brakes, and also serves to equalize the force applied to the rear brakes with respect to that applied to the front brakes. Obviously, by varying the points of attachment of the links 55 and 59 to the equalizers 54 and 58, respectively, the relative amount of force applied to the front and rear pairs of brakes may be varied, and if desired these links 54 and 59 may be provided with one or more holes 67 to permit such adjustment.

A further feature of the invention is to provide means for preventing the breakage of one of the tension members from rendering the remaining brake-actuating means inoperative. This is accomplished by providing means for limiting the maximum brake-applying movement of preferably each of the side frame bell-crank levers.

A simple and convenient construction is illustrated in Fig. 3 as applied to the arms 56 and 57 of the side frame bell-crank levers 39 and 47, and comprises set screws 68 which are seated in the arms 56 and 57, respectively, and provided with lock nuts 69 which may be set up against the arms of the levers so as to hold the set screws in adjusted position. The ends of the set screws are adapted to engage shoulders 70 upon bosses projecting through the brackets 41 and 49, respectively.

In the event of breakage of the tension link 37 the bell-crank lever can only be swung about its fulcrum sufficiently to cause engagement of the end of the set screw 68 with the shoulder 70. The maximum movement, therefore, of the arm 56 of the bell-crank lever 39 will be so limited that when tension is applied through the link 59 to the equalizer 58 the equalizer will act as a lever to transmit sufficient force through the bell-crank lever 57 and the tension rod 45 to the brake-actuating arm 43 as to apply the front brake upon that side. At the same time, the lateral movement of the intermediate floating bell-crank lever 60 will be limited so that braking force will be applied to the equalizer 34, the side frame bell-crank levers 38 and 46, and the tension links 36 and 44, to the brake-actuating arms 35 and 42. Thus, three of the four brakes will be effective, although perhaps in a somewhat slightly lessened degree. Similar or equivalent means for limiting the maximum movement of the other side frame bell-crank levers may be employed for the same purpose. Desirably, means are provided for permitting proper adjustment of the lengths of the tension links. This may be accomplished by forming the tension mechanism in sections connected by turnbuckles, as illustrated in Fig. 1, but, also, and preferably, may be accomplished by providing each link, such as the link 36 illustrated in Fig. 4, with a connecting member in the form of a clevis 71 having an internally screw-threaded shank 72 to receive the threaded end 36 of the tension link, with a lock nut 73 upon the screw threads of the tension link 36 adapted to abut against the shoulder of the shank 72. The arms of the clevis may embrace and be secured by a suitable pintle 74 to the end of a bell-crank lever. Such clevises may be made of any desired size, and can therefore readily be formed to embrace the floating bell-crank lever 60 and receive the pivoted pintle 63, which also connects the same to the link 64.

The brackets, bell-crank levers, and equalizers may conveniently be made of short steel forgings or stampings of sufficient rigidity to be practically unyielding. The tension members may be usual steel rods of small diameter which are practicably inextensible under the maximum force which can be exerted through the usual brake-applying means. These members may be assembled, in the manner above described, upon the chassis of the vehicle in such a way as to avoid interference with the propeller shaft and other usual mechanisms of an automobile without modification of the usual construction thereof. By the use of the transverse tension members any slight bending thereof which might be occasioned by the unusual movement of the propeller shaft will not interfere with the operation of the brake-applying mechanism, for, obviously, any slight shortening which might be occasioned by such bending will not affect the equalizing of the power applied to the brakes.

It will be understood that the words "unyielding" and "inextensible" as used herein are not intended to define members which are absolutely incapable of yielding or being extended by any force which may be applied to them, but are intended to define members which do not yield to any substantial amount and cannot be substantially extended by the maximum force which is applied to them through the operation of the brake pedal or other brake-applying means.

It will be understood that the particular embodiments of the invention disclosed herein are of an illustrative character and are not restrictive, and the various changes in form, construction and arrangement of parts may be made within the spirit and scope of the following claims.

Having thus described the invention, what is claimed as new, and desired to be secured by Letters Patent, is:

1. Braking mechanism for vehicles, having a frame, front and rear pairs of wheels, a brake for each wheel provided with actuating means and manually-controlled power-applying means, comprising a system of inextensible tension members flexibly connected at one end to said power-applying means and at the other end to the respective brake-actuating means and having an intermediate pivotally and laterally and bodily movable power-transmitting means and means operable thereby to equalize the power applied by the power-applying means to the respective brake-actuating means.

2. Braking mechanism for vehicles, having a chassis comprising side frames, front and rear pairs of wheels, with a brake for each wheel provided with actuating means and manually-controlled power-applying means, comprising tension members connected to the respective brake-actuating means extending longitudinally of the vehicle frame and located wholly outside of the respective side frames, tension members extending transversely of the frame, flexibly connected to said longitudinally-extending tension members, and unyielding means connecting said transverse tension members to said power-applying means.

3. Braking mechanism for vehicles, having a chassis comprising side frames, front and rear pairs of wheels, with a brake for each wheel provided with actuating means and manually-controlled power-applying means comprising tension members connected to the respective brake-actuating means extending longitudinally of the vehicle frame and located wholly outside of the respective side frames, tension members extending transversely of the frame flexibly connected to said longitudinally-extending tension members, and unyielding equalizing means connected to said transverse tension members and to said power-applying means.

4. Braking mechanism for vehicles having a chassis comprising side frames, front and rear pairs of wheels, with a brake for each wheel provided with actuating means and manually-controlled power-applying means, comprising tension members connected to the respective brake-actuating means extending longitudinally of the frame, bell-crank levers pivotally mounted upon the side frames connected to said tension members, transverse tension members connected to said bell-crank levers, an intermediate bell-crank lever having a floating fulcrum pivotally connected to said frame, said transverse tension members being connected to said side frame bell-crank levers and so connected to said intermediate bell-crank lever as to equalize power transmitted therethrough to said tension members and an inextensible link connecting said intermediate bell-crank lever to said power-applying means.

5. Braking mechanism for vehicles having a chassis comprising side frames, front and rear pairs of wheels, with a brake for each wheel provided with actuating means and manually-controlled power-applying means, comprising tension members connected to the respective brake-actuating means extending longitudinally of the frame, bell-crank levers pivotally mounted upon the side frames connected to said tension members, transverse tension members connected to said bell-crank levers, an intermediate bell-crank lever having a floating fulcrum pivotally connected to said frame by an inextensible link, said transverse tension members being connected to said side frame bell-crank levers and so connected to said intermediate bell-crank lever as to equalize power transmitted therethrough to said tension members and an inextensible link connecting said intermediate bell-crank lever to said power-applying means.

6. Braking mechanism for vehicles having a chassis comprising side frames, a pair of wheels, with a brake for each wheel provided with actuating means and manually-controlled power-applying means, comprising tension members connected to the respective brake-actuating means extending longitudinally of the frame, bell-crank levers pivotally mounted upon the side frames connected to said tension members, transverse tension members connected to said bell-crank levers, an intermediate bell-crank lever having a floating fulcrum pivotally connected to said frame by an inextensible link, said transverse tension members being connected to said side frame bell-crank levers and so connected to said intermediate bell-crank lever as to equalize power transmitted therethrough to said tension members and an inextensible link connecting said intermediate bell-crank lever to said power-applying means, and adjustable means for limiting the amplitude of movement of the respective side frame bell-crank levers, whereby breakage of a tension member leading from a side frame bell-crank lever to its brake-actuating means will not prevent actuation of the companion brake-actuating means.

7. Braking mechanism for vehicles, having a plurality of pairs of wheels, a brake for each wheel provided with actuating means and manually-controlled power-applying means, comprising unyielding tension members connecting said power-applying means to said brake-actuating means, including unyielding power-transmitting means operable to equalize the power applied by the brake lever to all of the respective brake-actuating means and to transmit such power unyieldingly to the respective brakes.

8. Braking mechanism for vehicles, having a plurality of pairs of wheels, a brake for each wheel provided with actuating means and manually-controlled power-applying means, a system of inextensible tension members flexibly connected at one end to said manually-controlled power-applying means and at the remote end to said respective brake-actuating means and having intermediate unyielding power-transmitting members operable to equalize the power applied by said power-applying means to all of the respective brake-actuating means and to transmit such power unyieldingly to the respective brakes.

9. Braking mechanism for vehicles, having a chassis comprising side frames, front and rear pairs of wheels, a brake for each wheel provided with actuating means and power-applying means, comprising inextensible tension members connected to the respective brake-actuating means extending longitudinally of the vehicle frame, pairs of unyielding bell-crank levers pivotally mounted upon the side frames having arms connected to said longitudinally-extending tension members, equalizers connecting the other arms of each pair of said bell-crank levers, transverse inextensible tension members connected to said equalizers and means connecting said power-applying means to said transverse tension members operable to equalize the power transmitted from said power-applying means to said transverse tension members.

10. Braking mechanism for vehicles, having a chassis comprising side frames connected by a central cross girder, front and rear pairs of wheels, a brake for each wheel provided with actuating means and power-applying means, comprising inextensible tension members flexibly connected at their remote ends to the respective brake-actuating means, pairs of unyielding bell-crank levers pivotally mounted upon said side frames in proximity to said cross girder with transversely-extending arms pivotally connected to the adjacent ends of said tension members, longitudinal arms extending towards each other, an equalizer flexibly connected to said longitudinally-extending arms, an intermediate bell-crank lever, having a floating fulcrum connected to said cross girder by an inextensible tension member, an intextensible tension member connecting said power-applying means to one arm of said intermediate bell-crank lever, and inextensible tension members so connecting the said intermediate bell-crank lever to said side frame equalizers as to equalize the power transmitted from the power-applying means to said equalizers and through said equalizers to the respective brake-actuating means.

11. Braking mechanism for vehicles, having a chassis comprising side frames connected by a central cross girder, front and rear pairs of wheels, a brake for each wheel provided with actuating means and power-applying means, comprising inextensible tension members flexibly connected at their remote ends to the respective brake-actuating means, pairs of unyielding bell-crank levers pivotally mounted upon said side frames in proximity to said cross girder with transversely-extending arms pivotally connected to the adjacent ends of said tension members, longitudinal arms extending towards each other, an equalizer flexibly connected to said longitudinally-extending arms, an intermediate bell-crank lever having a floating fulcrum connected to said cross girder by an inextensible tension member, an inextensible tension member connecting said power-applying means to one arm of said intermediate bell-crank lever, inextensible tension members so connecting the said intermediate bell-crank lever to said side frame equalizers as to equalize the power transmitted from the power-applying means to said equalizers and through said equalizers to the respective brake-actuating means, and means operable to limit the brake-applying movement of the respective side frame bell-crank levers, whereby the breakage of a tension member connecting such bell-crank lever to its brake-actuating means will not prevent actuation of the remaining brake-actuating means.

12. Braking mechanism for vehicles, having a chassis comprising side frames, front and rear pairs of wheels, a brake for each wheel provided with actuating means and power-applying means, comprising inextensible tension members connected to the respective brake-actuating means located outside of said side frames and extending longitudinally of the vertical frame, pairs of unyielding bell crank levers pivotally mounted upon the side frames having arms connected to said longitudinally extending tension members, transverse inextensible tension members connected to the other arms of said bell crank levers, and means connecting said power-applying means to said transverse tension members.

13. Braking mechanism for vehicles, having a chassis comprising side frames, front and rear pairs of wheels, a brake for each wheel provided with actuating means and power-applying means, comprising inextensible tension members connected to the respective brake-actuating means located outside of said side frames and extending longitudinally of the vertical frame, pairs of unyielding bell crank levers pivotally mounted upon the side frames having arms connected to said longitudinally extending tension members, equalizers connecting the other arms of each pair of bell crank levers, transverse inextensible tension members connected to said equalizers, and means connecting said power-applying means to said transverse tension members.

In testimony whereof, I have signed my name to this specification.

RALPH M. LOVEJOY.